(12) United States Patent
Huang et al.

(10) Patent No.: US 11,044,795 B2
(45) Date of Patent: Jun. 22, 2021

(54) COLOR PICKING DEVICE AND COLOR PICKING REMOTE CONTROLLER (71) Applicant: OPPLE LIGHTING CO., LTD., Shanghai (CN)

(72) Inventors: Aiqin Huang, Shanghai (CN); Mantang Hong, Shanghai (CN); Song Yin, Shanghai (CN); Jianguo Li, Shanghai (CN); Shitao Deng, Shanghai (CN)

(73) Assignee: Opple Lightin Co., Ltd., Shanghai (CN)

( * ) Notice: Subject to any disclaimer, the term of this patent is extended or adjusted under 35 U.S.C. 154(b) by 185 days.

(21) Appl. No.: 16/511,773

(22) Filed: Jul. 15, 2019

(65) Prior Publication Data
US 2019/0350068 A1 Nov. 14, 2019

Related U.S. Application Data (63) Continuation of application No. PCT/CN2018/073227, filed on Jan. 18, 2018.

(30) Foreign Application Priority Data

Jan. 19, 2017 (CN) .......................... 201720077218.6

(51) Int. Cl.
*H05B 47/105* (2020.01)
*G01J 3/46* (2006.01)
(Continued)

(52) U.S. Cl.
CPC .......... *H05B 47/105* (2020.01); *G01J 3/0208* (2013.01); *G01J 3/0256* (2013.01);
(Continued)

(58) Field of Classification Search
CPC .......... G01J 3/10; G01J 3/0262; G01J 3/0256; G01J 3/0208; G01J 3/50; G02B 7/021; G02B 13/005; G02B 9/12
See application file for complete search history.

(56) References Cited

U.S. PATENT DOCUMENTS 5,754,283 A * 5/1998 Keane ........................ G01J 3/02
356/402
6,147,761 A * 11/2000 Walowit ................ G01J 3/0251
356/328
(Continued)

FOREIGN PATENT DOCUMENTS

CN 104036226 A 9/2014
CN 104486862 A 4/2015
(Continued)

OTHER PUBLICATIONS

International Search Report and Written Opinion issued in PCT/CN2018/073227, dated Mar. 28, 2018,11 pages.

*Primary Examiner* — Dominic J Bologna
(74) *Attorney, Agent, or Firm* — Arch & Lake LLP (57) ABSTRACT A color picking device and a color picking remote controller are provided. The color picking device is configured to acquire a color of a target object, which includes: a substrate; a light emitting module configured to emit white light toward the target object, where the light emitting module that includes a light source and a light distribution element; and a color receiving module configured to receive light reflected by the target object and having the color of the target object after the target object is illuminated by the white light, where the color receiving module includes a first housing, a lens assembly disposed in the first housing, and the sensing element, where the lens assembly includes a first convex lens, an aperture, a concave lens and a second
(Continued)

convex lens that are coaxially arranged from top to bottom along a top of the first housing.

18 Claims, 7 Drawing Sheets

(51) Int. Cl.
| | |
|---|---|
| *G01J 3/50* | (2006.01) |
| *G01J 3/02* | (2006.01) |
| *G01J 3/10* | (2006.01) |
| *G02B 7/02* | (2021.01) |
| *G02B 13/00* | (2006.01) |
| *G02B 9/12* | (2006.01) |
| *H05B 47/11* | (2020.01) |

(52) U.S. Cl.
CPC ............... *G01J 3/0262* (2013.01); *G01J 3/10* (2013.01); *G01J 3/462* (2013.01); *G01J 3/50* (2013.01); *G02B 7/021* (2013.01); *G02B 9/12* (2013.01); *G02B 13/005* (2013.01); *H05B 47/11* (2020.01)

(56) References Cited

U.S. PATENT DOCUMENTS

| | | | | |
|---|---|---|---|---|
| 7,259,853 | B2* | 8/2007 | Hubble, III | G01J 3/10 356/319 |
| 7,408,644 | B2* | 8/2008 | Yamauchi | G01N 21/78 356/402 |
| 9,007,586 | B2* | 4/2015 | Clark | G02B 13/22 356/402 |
| 2003/0169421 | A1* | 9/2003 | Ehbets | G01J 3/0278 356/328 |
| 2006/0215162 | A1* | 9/2006 | Shannon | G01J 3/02 356/419 |
| 2007/0206391 | A1* | 9/2007 | Matsuo | G06K 9/2027 362/558 |
| 2009/0279092 | A1* | 11/2009 | Tsao | G01J 3/0267 356/402 |
| 2013/0037720 | A1* | 2/2013 | Reinke | G02B 19/009 250/341.1 |
| 2013/0242361 | A1* | 9/2013 | Matsumoto | G01J 3/524 358/504 |
| 2015/0109646 | A1* | 4/2015 | Yokozawa | H04N 1/0009 358/500 |

FOREIGN PATENT DOCUMENTS

| | | |
|---|---|---|
| CN | 205883636 U | 1/2017 |
| CN | 206817411 U | 12/2017 |
| JP | 3011211 B1 | 2/2000 |

* cited by examiner

COLOR PICKING DEVICE AND COLOR PICKING REMOTE CONTROLLER

CROSS-REFERENCE TO RELATED APPLICATIONS

This application is based upon and claims the priority of PCT patent application No. PCT/CN2018/073227 filed on Jan. 18, 2018 which claims the priority of Chinese Patent Application No. 201720077218.6 filed on Jan. 19, 2017, the entire content of all of which is hereby incorporated by reference herein for all purposes.

TECHNICAL FIELD

The present disclosure relates to a technical filed of lighting, and particularly relates to a color picking device used in a remote controller of a lighting device and a color picking remote controller.

BACKGROUND

With the continuous development of lighting technology, color lighting devices capable of emitting different colors of light have been widely used. How to adjust the color of these color lighting devices to make the color of the light emitted by the lighting devices match the lighting environment or meet the needs of users, have gradually attracted the attention of the industry.

SUMMARY

The present disclosure provides a color picking device, a color picking remote controller and a method of manufacturing a color picking device.

According to a first aspect, a color picking device is provided. The color picking device may include a substrate; a light emitting module configured to emit white light toward the target object, where the light emitting module may include a light source and a light distribution element configured to collect light emitted by the light source, and the light source is located on the substrate; and a color receiving module disposed on the substrate, where the color receiving module may be configured to receive light reflected by the target object and having the color of the target object after the target object is illuminated by the white light, and where the color receiving module may include a first housing, a lens assembly disposed in the first housing for light distribution and a sensing element for receiving light color, the sensing element is located on the substrate, the lens assembly may include a first convex lens, an aperture, a concave lens and a second convex lens coaxially arranged from top to bottom along a top of the first housing.

According to a second aspect, a color picking remote controller is provided. The color picking remote controller may be configured to control a color of light emitted by a target lighting device, and may include a housing and a remote control terminal main control board disposed in the housing, where the remote control terminal main control board may be provided with a color picking device that is configured to acquire a color of a target object.

The color picking device may include a substrate; a light emitting module configured to emit white light toward the target object, where the light emitting module may include a light source and a light distribution element configured to collect light emitted by the light source, and the light source is located on the substrate; and a color receiving module disposed on the substrate, where the color receiving module may be configured to receive light reflected by the target object and having the color of the target object after the target object is illuminated by the white light, and where the color receiving module may include a first housing, a lens assembly disposed in the first housing for light distribution and a sensing element for receiving light color, the sensing element is located on the substrate, the lens assembly may include a first convex lens, an aperture, a concave lens and a second convex lens coaxially arranged from top to bottom along a top of the first housing.

According to a third aspect, a method of manufacturing a color picking device for acquiring a color of a target object is provided. The method may include providing a substrate; configuring a light emitting module to emit white light toward the target object, where the light emitting module may include a light source and a light distribution element configured to collect light emitted by the light source, and the light source is located on the substrate; and disposing a color receiving module on the substrate, where the color receiving module may be configured to receive light reflected by the target object and having the color of the target object after the target object is illuminated by the white light, and where the color receiving module may include a first housing, a lens assembly disposed in the first housing for light distribution and a sensing element for receiving light color, the sensing element is located on the substrate, the lens assembly may include a first convex lens, an aperture, a concave lens and a second convex lens coaxially arranged from top to bottom along a top of the first housing.

It is to be understood that both the foregoing general description and the following detailed description are exemplary and explanatory only and are not restrictive of the present disclosure.

BRIEF DESCRIPTION OF THE DRAWINGS

In order to clearly illustrate the technical solution of the examples of the disclosure or the technical solution of conventional technologies, the drawings of the examples or the drawings of the conventional technologies will be briefly described in the following; it is obvious that the described drawings are only related to some examples of the disclosure. For those skilled in the art, other drawings can be obtained according to these drawings, without any inventive work.

DETAILED DESCRIPTION

The examples of the present disclosure are described in detail below, and examples of the examples are illustrated in the accompanying drawings, wherein the same or similar reference numerals indicate the same or similar elements or elements having the same or similar functions. The examples described below with reference to the accompanying drawings are exemplary, and are intended to illustrate the present disclosure rather than to constrain the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference numerals shown in FIG. 1 to FIG. 7 are: Numerals in the accompanying drawings are: color picking device 100, substrate 1, through-hole 11, through-groove 12, mounting hole 13, light emitting module 2, light source 21, light distribution element 22, opening 221, reflecting surface 222, connecting member 23, first connecting portion 231, receiving groove 232, color receiving module 3, first housing 31, mounting portion 311, second connecting portion 312, protruding portion 313, screw hole 314, protrusion 315, second housing 32, third connecting portion 321, main body portion 322, lens assembly 33, first convex lens 331, aperture 332, concave lens 333, second convex lens 334, third convex lens 335, sensing element 34, first receiving cavity 35, second receiving cavity 36, first hole portion 361, second hole portion 362, target object 4, color picking remote controller 500, housing 5, main control board 6, color picking switch 7.

In general, a remote control is used to control the color of the light emitted by the color lighting devices, that is, several commonly used colors are pre-recorded in the production process. These commonly used colors are difficult to match the diverse lighting environment in reality, so that the operator cannot use a remote controller to adjust the color of the light emitted by the color lighting devices according to the color of the lighting environment, which results in a monotonous color of the light emitted by the color lighting devices.

Sometimes, some remote controllers are equipped with color picking devices to acquire the color of an external object, so that the remote controllers can control the lighting devices to emit light of the acquired color according to the color acquired by the color picking devices. However, these color picking devices are usually complex in structure and vulnerable to the influence of ambient light when picking color, and the acquired color is easily distorted.

As shown in FIG. 1 to FIG. 5, the present disclosure provides a color picking device 100, which comprises a substrate 1, a light emitting module 2 and a color receiving module 3 configured to receive color disposed on the substrate 1. The light emitting module 2 is configured to emit white light toward a target object 4 facing the color picking device 100. After the target object 4 is illuminated, a color light thereof is incident on the color receiving module 3 after being diffusely reflected and received by the color receiving module 3. The components of the color picking device 100 are described in detail below.

Figure 1:
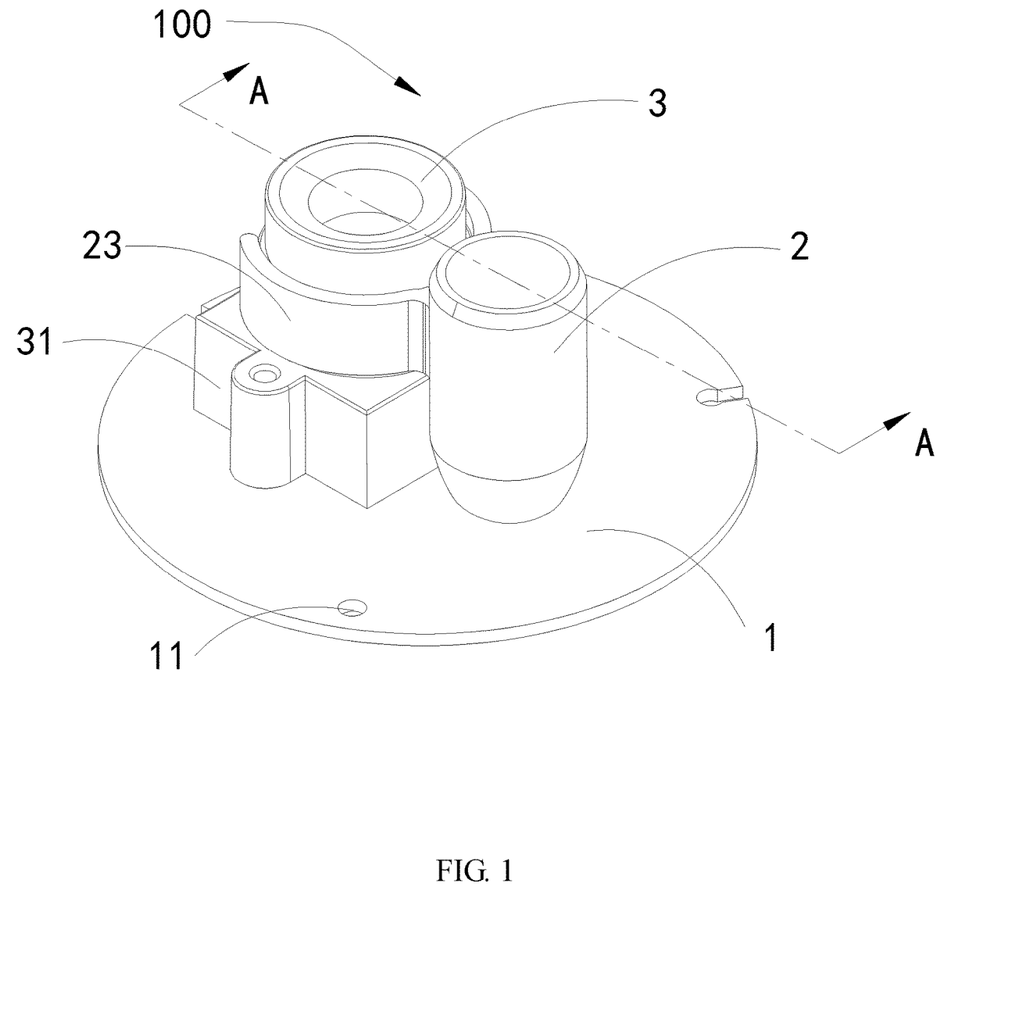
FIG. 1 is a schematic view of a color picking device of the present disclosure.
Figure 2:
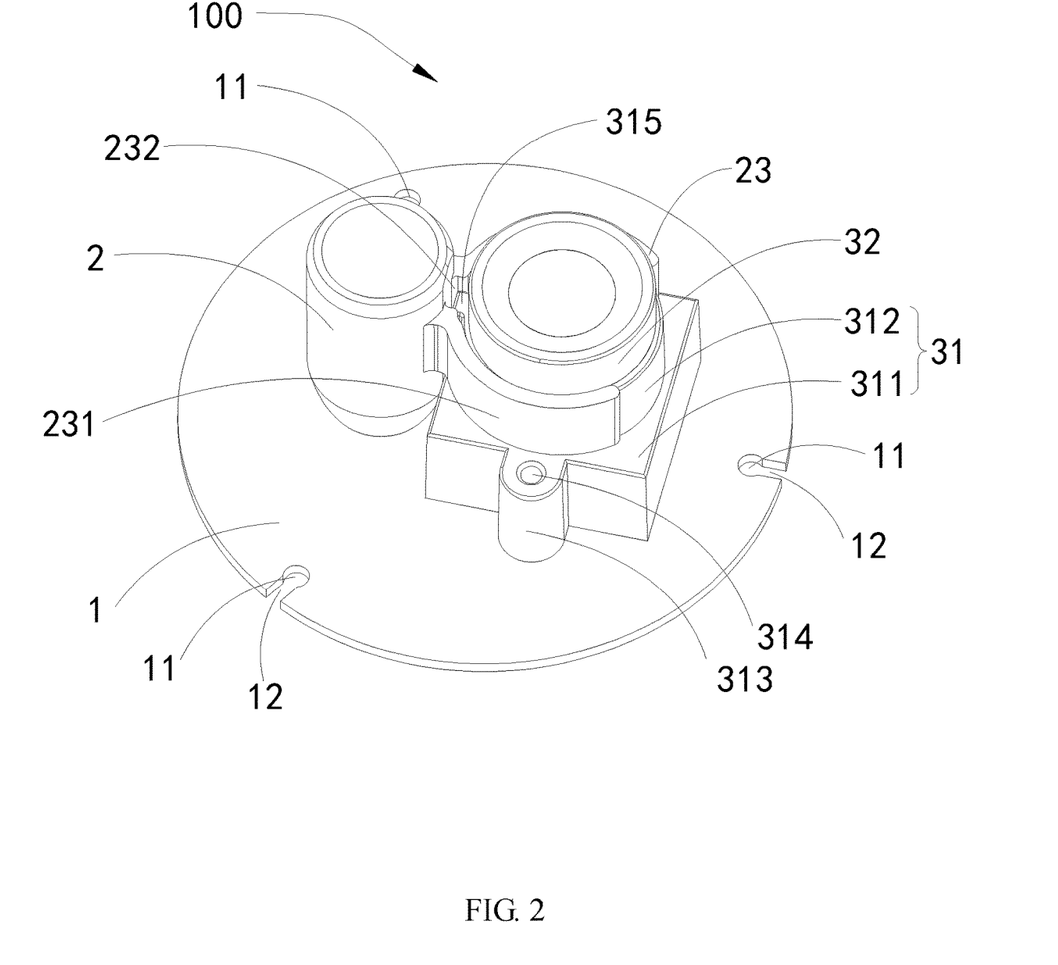
FIG. 2 is a schematic view of another direction of a color picking device of the present disclosure.
Figure 3:
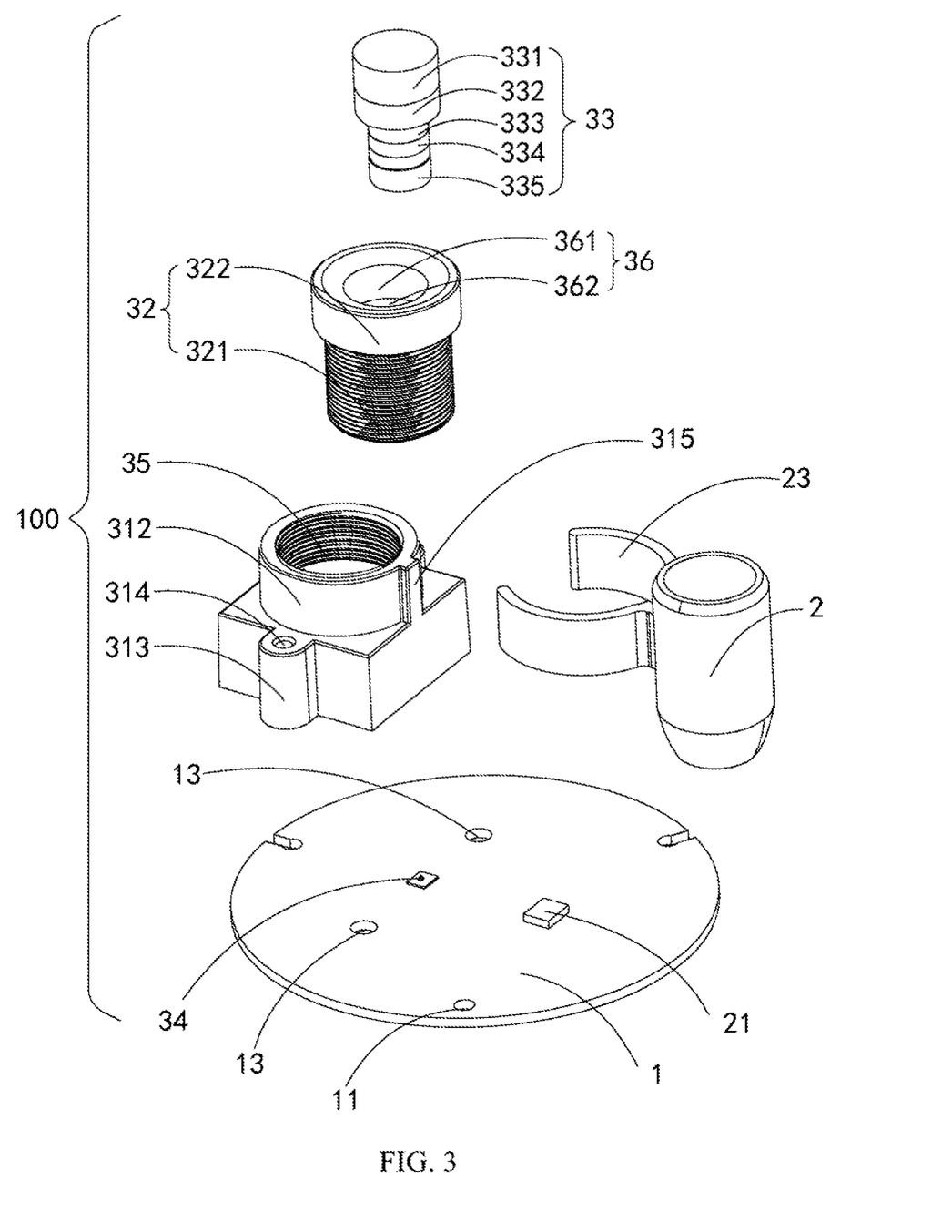
FIG. 3 is an exploded view of a color picking device of the present disclosure.

As shown in FIG. 1 to FIG. 3, the substrate 1 is used for mounting the light emitting module 2 and the color receiving module 3. The substrate 1 has a circular shape. The substrate 1 is provided with three through-holes 11 uniformly distributed along the circumferential direction of the substrate 1, of which two through-holes 11 extend outward to the edge of the substrate 1 to form through-grooves 12. And the intermediate portion of the substrate 1 is provided with two mounting holes 13. The color picking device 100 can be mounted on a remote controller by screws (not shown) passing through the through-holes 11. The two through-grooves 12 allow the substrate 1 to be adjusted during installation, making installation more convenient.

As shown in FIG. 1 to FIG. 4, the light emitting module 2 includes a light source 21, a light distribution element 22 configured to perform a secondary light distribution on light emitted by the light source 21, and a connection member 23 connected to the light distribution element 22. Specifically, the light distribution element 22 can be a reflective cup or a lens. In the present example, a reflective cup is preferably used as the light distribution element 22. The bottom of the light distribution element 22 is connected to the substrate 1. The light source 21 is disposed on the substrate 1 and surrounded by the light distribution element 22. The light distribution element 22 has a cylindrical shape, and two first connecting portions 231 extends outward from the intermediate portion of the light distribution element 22, and each of the first connecting portions 231 has an arc-shaped arm shape. The two first connecting portions 231 form the connecting member 23. Specifically, the connecting member 23 is a snap ring having a notch. A center line of the snap ring is parallel to a center line of the light distribution element 22, and a receiving groove 232 is formed between the bottoms of the two first connecting portions 231.

Figure 4:
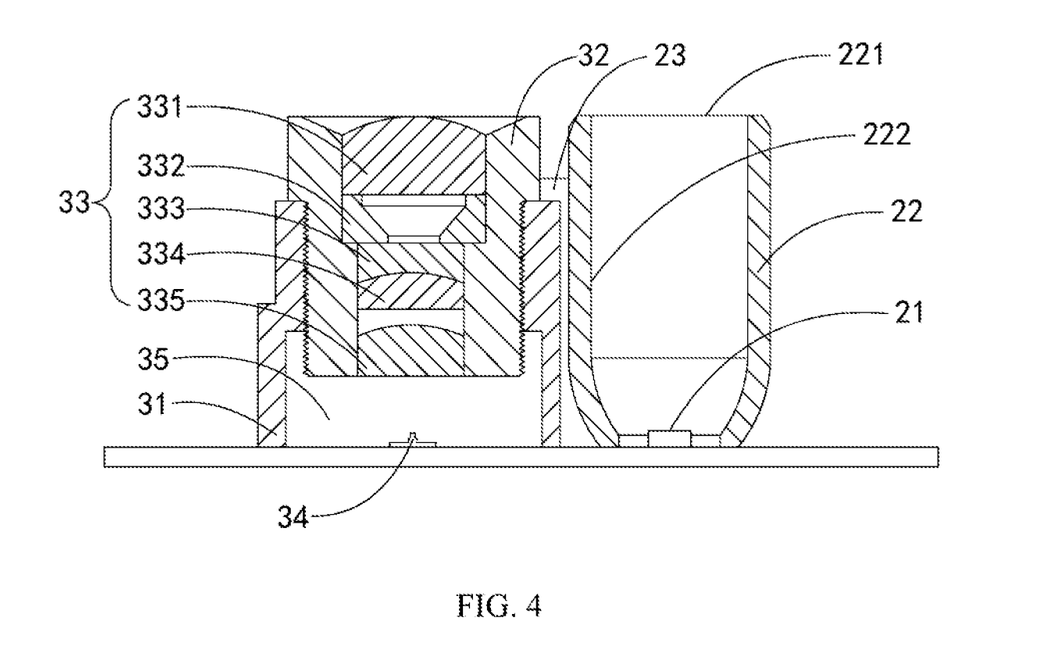
FIG. 4 is a cross-sectional view taken along the direction A-A of FIG. 1.

As shown in FIG. 4, further, an upper portion of the light distribution element 22 is provided with an opening 221 for emitting light emitted by the light source 21. An inner surface of the light distribution element 22 is a reflecting surface 222, and a bottom portion thereof has a small cross-sectional area. The light source 21 is a white light source, and light emitted by the light source 21 is reflected by the light distribution element 22 and then emitted from the opening 221 of the upper portion of the light distribution element 22. After the light emitted by the light source 21 is distributed by the light distribution element 22, a beam angle of the light can be reduced, and the light is concentrated on a small region of the target object, such as a small region of a target object like clothes, wall, furniture, etc., the color light of the target object is diffusely reflected and then emitted at various angles.

As shown in FIG. 1 to FIG. 3, the color receiving module 3 includes a first housing 31 disposed on the substrate 1, a second housing 32 screwed to the first housing 31, a lens assembly 33 disposed in the second housing 32, and a sensing element 34 disposed on the substrate 1 and opposite to the lens assembly 33. As shown in FIG. 2 to FIG. 4, an outer surface of the first housing 31 is stepped and has a hollow structure, and a first receiving cavity 35 for accommodating a part of the second housing 32 is formed therein. Specifically, the first housing 31 includes a mounting portion 311 having a rectangular block shape and being hollow, and a second connecting portion 312 having a cylindrical shape and being connected to the mounting portion 311. Specifically, two side surfaces of the mounting portion 311 extend outward to form protruding portions 313, respectively, and the two protruding portions 313 are provided with screw holes 314 corresponding to the two mounting holes 13, respectively.

The color receiving module 3 can be connected to the substrate 1 by screws passing through the screw holes 314 and the mounting holes 13. In other alternative examples of the present disclosure, the color receiving module 3 can also be snap-fitted or soldered or bonded, etc., to the substrate 1. The second connecting portion 312 and the mounting portion 311 are integrated, the second connecting portion 312 is provided with an internal screw thread that cooperates with the second housing 32, and one side of the second connecting portion 312 is provided with a long strip-shaped protrusion 315 in a vertical direction. When the light emitting module 2 is assembled with the color receiving module 3, the protrusion 315 is accommodated in the receiving groove 232, and the first connecting portions 231 clip and surround the second connecting portion 312 at an outer side of the second connecting portion 312.

The cooperation of the protrusion 315 and the receiving groove 232 and the cooperation of the first connecting portions 231 and the second connecting portion 312 enable the light emitting module 2 and the color receiving module 3 to be firmly connected. The light emitting module 2 is fixed to the color receiving module 3, and does not need to be additionally mounted on the substrate 1. Moreover, the first connecting portions 231 is squeezed and then surrounds the second connecting portion 312, which is convenient and reliable to assemble, and convenient to disassemble.

As other examples of the present disclosure, the light emitting module 2 and the color receiving module 3 can be integrated, and the materials of the light emitting module 2 and the color receiving module 3 are the same; alternatively, the light emitting module 2 and the color receiving modules 3 are not connected, but are assembled to the substrate 1, respectively, and details are not be described herein.

As shown in FIG. 2 to FIG. 4, the second housing 32 has a substantially stepwise shape, and a second receiving cavity 36 for accommodating the lens assembly 33 is formed therein. Specifically, the second housing 32 includes a third connecting portion 321 and a main body portion 322 connected to the third connecting portion 321. An outer diameter of the third connecting portion 321 is less than a diameter of the main body portion 322, and the third connecting portion 321 is provided with an external screw thread. When the third connecting portion 321 is mounted into the second connecting portion 312 of the first housing 31, the bottom of the main body portion 322 abuts against the second connecting portion 312. The second receiving cavity 36 has a stepped hole shape, and includes a first hole portion 361 and a second hole portion 362 connected to the first hole portion 361. An inner diameter of the first hole portion 361 is greater than an inner diameter of the second hole portion 362.

Figure 5:
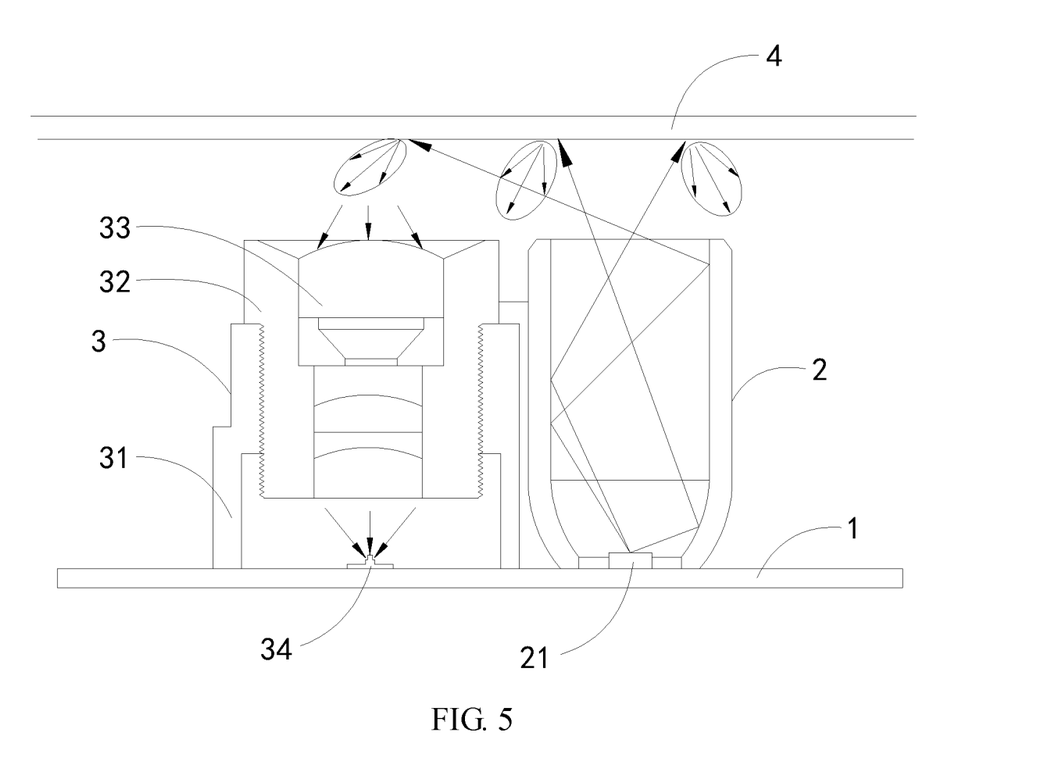
FIG. 5 is a schematic view showing a color picking optical path of a color picking device of the present disclosure.

In conjunction with FIG. 4 and FIG. 5, as an example of the lens assembly 33 in the color receiving module 3 of the present disclosure, the lens assembly 33 includes a first convex lens 331, an aperture 332, a concave lens 333, a second convex lens 334 and a third convex lens 335 housed in the second housing 32 and arranged from top to bottom, respectively. The first convex lens 331 and the aperture 332 are received in the first hole portion 361 of the second receiving cavity 36, and the concave lens 333, the second convex lens 334 and the third convex lens 335 are received in the second hole portion 362 of the second receiving cavity 36. Specifically, when the color picking device 100 picks color, the first convex lens 331 focuses the light being diffusely reflected by the target object and then entering the color receiving module 3 into parallel light.

The aperture 332 can shield the interference of surrounding ambient light to make the color of the light entering the color receiving module 3 not distorted. Then, the light is diffused by the concave lens 333 to eliminate the aberration, and then is focused by the second convex lens 334 and the third convex lens 335, sequentially, and finally is incident on the sensing element 34. Specifically, the sensing element 34 in the present example is a color sensor for receiving the color of light. Because the second convex lens 334 and the third convex lens 335 which are stacked are disposed, the two convex lenses 334, 335 are superimposed such that a combined focal length of the second convex lens 334 and the third convex lens 335 is reduced. Therefore, a distance from the sensing element 34 to the second convex lens 334 and the third convex lens 335 is shortened, so that an overall height of the color receiving module 3 is reduced, which satisfies a design purpose of a compact structure of the color picking device 100 of the present disclosure.

As another example of the present disclosure, the lens assembly 33 can also include only one of the second convex lens 334 and the third convex lens 335. At this time, the light is diffused by the concave lens 333 to eliminate the aberration, and then is directly focused by the second convex lens 334 or the third convex lens 335, and finally is incident on the sensing element 34.

The color picking device 100 provided by the examples of the disclosure can shorten the focal length of the color receiving module 3 by using three convex lenses. On one hand, a receiving range of the signal is enlarged, and on the other hand, the height of the whole device is smaller. The concave lens 333 is used so that the signal is precisely focused onto the sensing element 34, which increases the response speed. The aperture 332 can shield the interference of surrounding ambient light and improve the resolution of the color, so that the color of the light entering the color receiving module 3 is not distorted.

As a further detailed description of the present example, the remote controller is provided with a controller, configured to pair with a lighting device, to control the lighting device to emit light or not, and to control the light color of the lighting device, etc. The sensing element 34 is configured to sense color information and transmit it to the controller (not shown) in the remote controller. Specifically, the sensing component 34 can select different sensors, such as color sensors or spectrum detectors, according to different applications of low end, medium end, and high end. In the present example, a color sensor is used to detect the color information of the illuminated object.

Figure 6:
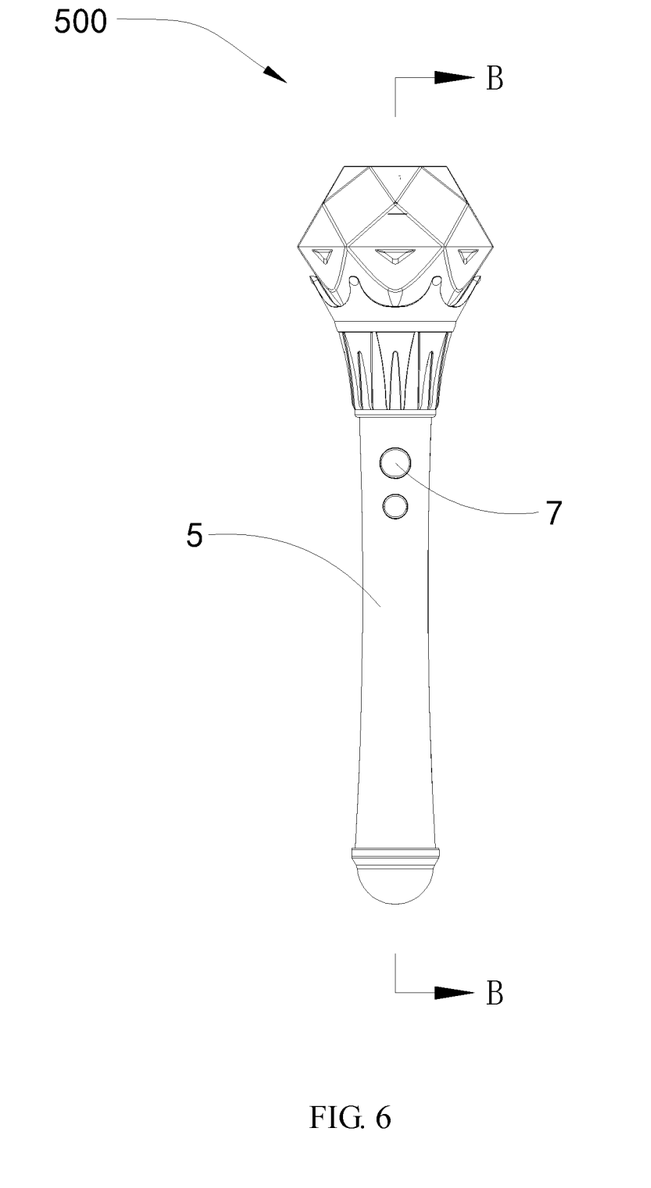
FIG. 6 is a schematic view of a color picking remote controller of the present disclosure.
Figure 7:
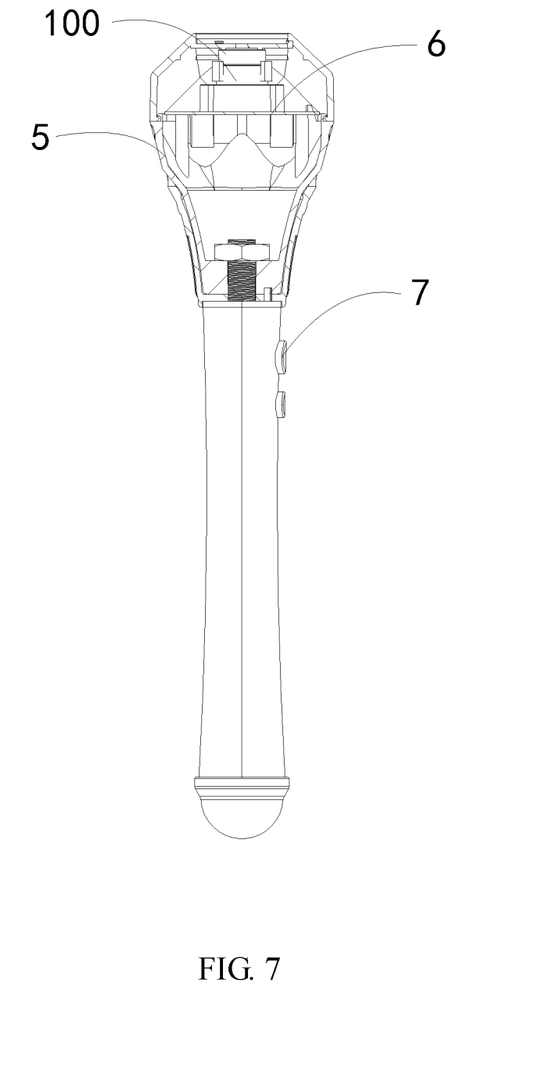
FIG. 7 is a cross-sectional view taken along the direction B-B of FIG. 6.

Referring to FIG. 6 and FIG. 7 on the basis of FIG. 1 to FIG. 5, the present disclosure further provides a color picking remote controller 500 configured to control a color of light emitted by a target lighting device, which includes a housing 5, a remote control terminal main control board 6 disposed in the housing 5, a color picking device 100 disposed on the remote control terminal main control board 6, a wireless transmission unit (not shown) configured to transmit color information to the target lighting device, a color picking switch 7 disposed on the housing 5 and electrically connected to the color picking device 100 and the wireless transmission unit.

The color picking switch 7 is configured to turn on and off the color picking device 100 and the wireless transmission unit. Pressing the color picking switch 7 can trigger that the color picking device 100 picks color to obtain color information, and the remote control terminal main control board 6 performs a computing process on the color information, and then transmits the color information to the lighting device through the wireless transmission unit, so that the lighting device obtains corresponding color information and emit light of the color. The color picking remote controller 500 is simple in structure and convenient to operate, and can make the lighting device emit light of a corresponding color according to requirements of customers. Further, a driving power component (not shown) connected to the remote control terminal main control board 6 is further disposed in the housing 5 for supplying power to the color picking remote controller 500.

The color picking device 100 of the present disclosure can be disposed at the head of a remote controller (not shown) of the lighting device for color picking. When the head of the remote controller faces the target object 4 such as a wall or clothes, etc., under the operation of an operator, the light emitting module 2 is configured to emit white light to the target object 4 facing the color picking device 100. After the target object 4 is illuminated, a color light of the target object 4 is diffusely reflected to the first convex lens 331. After the first convex lens 331 focuses the light, the surrounding ambient light is shielded by the aperture 332, and the resolution of the color is improved, so that the color resolution of the light entering the color receiving module 3 is high and the color is not distorted. Then the light is diffused by the concave lens 333 to eliminate the aberration, and then is focused by the second convex lens 334 and the third convex lens 335, sequentially, and finally is incident on the sensing element 34. According to the requirements of customers, the color of the target object 4 can be picked and transmitted to the controller in the remote controller, and the lighting device can emit light of the corresponding color under the control of the remote controller.

The present disclosure provides a color picking device disposed in a remote controller of a lighting device and capable of acquiring the color of an illuminated object, and a color picking remote controller having the color picking device. The color picking device has a simple structure and can acquire the color of the illuminated object accurately.

The present disclosure provides a color picking device configured to acquire a color of a target object, which includes:

a substrate;

a light emitting module, configured to emit white light toward the target object, the light emitting module including a light source and a light distribution element configured to collect light emitted by the light source, the light source being located on the substrate;

a color receiving module disposed on the substrate, configured to receive light reflected by the target object and having the color of the target object after the target object being illuminated by the white light, the color receiving module including a first housing, a lens assembly disposed in the first housing for light distribution and a sensing element for receiving light color, the sensing element being located on the substrate, the lens assembly including a first convex lens, an aperture, a concave lens and a second convex lens coaxially arranged from top to bottom along a top of the first housing.

Further, the light emitting module and the color receiving module are integrated or assembled.

Further, the light emitting module further includes a connecting member extending from the light distribution element, and the connecting member is connected to the color receiving module.

Further, the connecting member includes two opposite first connecting portions, and the two first connecting portions are sleeved on the color receiving module.

Further, the light distribution element is a reflective cup or a reflector.

Further, the color receiving module further includes a second housing detachably coupled to the first housing, the first convex lens, the aperture, the concave lens and the second convex lens are arranged in the second housing and downward from the top of the second housing, respectively.

Further, the lens assembly further includes a third convex lens disposed above or below the second convex lens and coaxial with the second convex lens.

Further, the first housing includes a mounting portion connected to the substrate and a second connecting portion connected to the mounting portion, the second connecting portion is provided with an internal screw thread, the second housing is provided with an external screw thread, the second housing is screwed to the second connecting portion.

Further, the mounting portion is screwed or snap-fitted or riveted or soldered to the substrate.

Further, two sides of the mounting portion are respectively provided with protruding portions in a direction perpendicular to a center line of the lens assembly, the protruding portions are respectively provided with screw holes, the first housing and the substrate are connected by screws passing through the screw holes of the protruding portions.

Further, the mounting portion, the second connecting portion and the protruding portions are integrated.

Further, the sensing element a color sensor or a spectrum detector.

The present disclosure further provides a color picking remote controller configured to control a color of light emitted by a target lighting device, including a housing and a remote control terminal main control board disposed in the housing, wherein the remote control terminal main control board is provided with any one of the color picking devices as described above.

Further, the remote control terminal main control board is further provided with a wireless transmission unit configured to transmit color information acquired by the color picking device to the target lighting device, the housing is provided with a color picking switch for turning on and off the color picking device and the wireless transmission unit.

Compared with other implementations, the color picking device provided by the present disclosure and used in a remote controller of a lighting device has a simple structure, and enables the sensing element to acquire the color of the object being illuminated accurately by that the first convex lens focuses the light being diffusely reflected by the target object and then entering the color receiving module into parallel light, then the aperture shields the interference of surrounding ambient light to make the color of the light entering the color receiving module not distorted, and then the concave lens diffuses the light to eliminate the aberration, and the second convex lens focuses the light to make the light incident on the sensing element.

The present disclosure also provides a method of manufacturing a color picking device for acquiring a color of a target object. The method may include providing a substrate; configuring a light emitting module to emit white light toward the target object, wherein the light emitting module comprises a light source and a light distribution element configured to collect light emitted by the light source, and the light source is located on the substrate; and disposing a color receiving module on the substrate, wherein the color receiving module is configured to receive light reflected by the target object and having the color of the target object after the target object is illuminated by the white light, and wherein the color receiving module comprises a first housing, a lens assembly disposed in the first housing for light distribution and a sensing element for receiving light color, the sensing element is located on the substrate, the lens assembly comprises a first convex lens, an aperture, a concave lens and a second convex lens coaxially arranged from top to bottom along a top of the first housing.

The method may also include integrating or assembling the light emitting module and the color receiving module. Additionally, the method may include providing a connecting member extending from the light distribution element for the light emitting module, and connecting the connecting member to the color receiving module. In the method, the light distribution element may be a reflective cup or a reflector.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The specific examples described above further illustrate objectives, technical solutions and beneficial effects of the present disclosure in detail. It should be noted that, what have been described above are only specific implementations of the present disclosure, but the present disclosure is not limited thereto. Therefore, any modifications, equivalents, improvements, etc., made within the spirit and the principles of the present disclosure, are intended to be included with the protection scope of the present disclosure.

What is claimed is:

1. A color picking device, configured to acquire a color of a target object, comprising:
   a substrate;
   a light emitting module configured to emit white light toward the target object, wherein the light emitting module comprises a light source and a light distribution element configured to collect light emitted by the light source, and the light source is located on the substrate, wherein the light distribution element comprises a reflective structure or lens; and
   a color receiving module disposed on the substrate, wherein the color receiving module is configured to receive light reflected by the target object and having the color of the target object after the target object is illuminated by the white light, and wherein the color receiving module comprises a first housing, a lens assembly disposed in the first housing for light distribution and a sensing element for receiving light color, the sensing element is located on the substrate, the lens assembly comprises a first convex lens, an aperture, a concave lens and a second convex lens coaxially arranged from top to bottom along a top of the first housing, wherein the sensing element comprises a color sensor, and wherein the light emitting module comprises two opposite first connecting portions that are sleeved on the color receiving module.

2. The color picking device according to claim 1, wherein the light emitting module and the color receiving module are integrated or assembled.

3. The color picking device according to claim 1, wherein the light emitting module further comprises a connecting member extending from the light distribution element, and the connecting member is connected to the color receiving module, wherein the connecting member comprises a snap ring.

4. The color picking device according to claim 3, wherein the connecting member comprises the two opposite first connecting portions.

5. The color picking device according to claim 1, wherein the light distribution element is a reflective cup or a reflector.

6. The color picking device according to claim 1, wherein the color receiving module further comprises a second housing detachably coupled to the first housing, and the first convex lens, the aperture, the concave lens and the second convex lens are arranged in the second housing and downward from the top of the second housing.

7. The color picking device according to claim 6, wherein the first housing comprises a mounting portion connected to the substrate and a second connecting portion connected to the mounting portion, wherein the second connecting portion is provided with an internal screw thread, the second housing is provided with an external screw thread, and the second housing is screwed to the second connecting portion.

8. The color picking device according to claim 7, wherein the mounting portion is screwed or snap-fitted or riveted or soldered to the substrate.

9. The color picking device according to claim 7, wherein two sides of the mounting portion are provided with protruding portions in a direction perpendicular to a center line of the lens assembly, wherein the protruding portions are provided with screw holes, the first housing and the substrate are connected by screws passing through the screw holes of the protruding portions.

10. The color picking device according to claim 9, wherein the mounting portion, the second connecting portion and the protruding portions are integrated.

11. The color picking device according to claim 1, wherein the lens assembly further comprises a third convex lens disposed above or below the second convex lens and the third convex lens is coaxial with the second convex lens.

12. The color picking device according to claim 1, wherein the sensing element is a color sensor or a spectrum detector.

13. A color picking remote controller, configured to control a color of light emitted by a target lighting device, comprising a housing and a remote control terminal main control board disposed in the housing, wherein the remote control terminal main control board is provided with a color picking device that is configured to acquire a color of a target object, and the color picking device comprises:

a substrate;

a light emitting module configured to emit white light toward the target object, wherein the light emitting module comprises a light source and a light distribution element configured to collect light emitted by the light source, and the light source is located on the substrate, wherein the light distribution element comprises a reflective structure or lens; and a color receiving module disposed on the substrate, wherein the color receiving module is configured to receive light reflected by the target object and having the color of the target object after the target object is illuminated by the white light, and wherein the color receiving module comprises a first housing, a lens assembly disposed in the first housing for light distribution and a sensing element for receiving light color, the sensing element is located on the substrate, the lens assembly comprises a first convex lens, an aperture, a concave lens and a second convex lens coaxially arranged from top to bottom along a top of the first housing, wherein the sensing element comprises a color sensor, and wherein the light emitting module comprises two opposite first connecting portions that are sleeved on the color receiving module.

14. The color picking remote controller according to claim 13, wherein the remote control terminal main control board is further provided with a wireless transmission unit configured to transmit color information acquired by the color picking device to the target lighting device, wherein the wireless transmission unit is a unit that comprises memory that stores instructions that can be executed by one or more processors; and the housing is provided with a color picking switch for turning on and off the color picking device and the wireless transmission unit.

15. A method of manufacturing a color picking device for acquiring a color of a target object, comprising:

providing a substrate;

configuring a light emitting module to emit white light toward the target object, wherein the light emitting module comprises a light source and a light distribution element configured to collect light emitted by the light source, and the light source is located on the substrate, wherein the light distribution element comprises a reflective structure or lens; and disposing a color receiving module on the substrate, wherein the color receiving module is configured to receive light reflected by the target object and having the color of the target object after the target object is illuminated by the white light, and wherein the color receiving module comprises a first housing, a lens assembly disposed in the first housing for light distribution and a sensing element for receiving light color, the sensing element is located on the substrate, the lens assembly comprises a first convex lens, an aperture, a concave lens and a second convex lens coaxially arranged from top to bottom along a top of the first housing, wherein the sensing element comprises a color sensor, and wherein the light emitting module comprises two opposite first connecting portions that are sleeved on the color receiving module.

16. The method according to claim 15, further comprising: integrating or assembling the light emitting module and the color receiving module.

17. The method according to claim 15, further comprising providing a connecting member extending from the light distribution element for the light emitting module, and connecting the connecting member to the color receiving module, wherein the connecting member comprises a snap ring.

18. The method according to claim 15, wherein the light distribution element is a reflective cup or a reflector.

* * * * *